June 23, 1970 W. H. CRIM 3,517,343

HIGH-FREQUENCY ACOUSTIC DELAY LINE

Filed June 10, 1966

WILLIAM H. CRIM
INVENTOR.

BY Charles R. Lepchinsky

ATTORNEY

United States Patent Office 3,517,343
Patented June 23, 1970

3,517,343

HIGH-FREQUENCY ACOUSTIC DELAY LINE

William H. Crim, San Leandro, Calif., assignor to The Singer Company, a corporation of New Jersey Filed June 10, 1966, Ser. No. 556,763
Int. Cl. H03h 7/30, 9/30
U.S. Cl. 333—30 2 Claims

ABSTRACT OF THE DISCLOSURE

An acoustic delay line is adapted to propagate high-frequency signals by using an input transducer which includes a short length of magnetostrictive material located at the input end of the delay line. An input coil surrounds the magnetostrictive material and has a length greater than the length of the magnetostrictive material. Since the width of an acoustic pulse induced into the delay line by an electrical signal applied to the input coil is determined by the length of the mangetostrictive material and not the length of the input coil, a much higher frequency signal can be propagated along the length of the delay line than is the case when the length of the input coil determines the width of the acoustic pulse induced in the delay line. This is so because an input coil, with its associated fringe effect, cannot be fabricated having a width as short as the width of a length of mangetostrictive material.

This invention relates to delay lines and more particularly to acoustic delay lines which are adapted to have a high-frequency signal applied thereto.

Acoustic delay lines have long been used in the electronic arts to provide a delay in excess of about one millisecond. Such delay lines have also been utilized as temporary and recirculating information storage devices. Generally, prior art acoustic delay lines include an elongated delay element such as a length of tape or wire of magnetostrictive material. An input coil is electromagnetically coupled to the delay element adjacent one end thereof and an output coil is electromagnetically coupled to the delay element adjacent the other end. A permanent magnet is positioned near the output coil so as to provide a steady magnetic field therethrough. A change of current in the input coil causes changes in the magnetization of the delay element which produces changes in its dimensions due to the well-known magnetostrictive effect. These dimensional changes produce longitudinal acoustic stress waves which have a length substantially equal to the length of the input coil and which propagate along the delay element in both directions from the input coil with a velocity which is approximately equal to the speed of sound through the material of the delay element. These stress waves traveling along the delay element produce dimensional changes therein which, when they pass through the output coil, vary the reluctance of the magnetic circuit produced by the permanent magnet to produce a change of flux which causes a voltage output signal to be induced in the output coil. The delay time of the delay line is determined by the distance between the input and output coils and the speed of sound in the delay element material. Since the path for the acoustic stress waves need not be straight, the delay element may be coiled up or otherwise configured so as to occupy a relatively small area. In order to prevent reflection of the acoustic waves from each end of the delay element, acoustic energy absorbing material is generally attached to each end of the delay element.

For some applications, such as information storage, it is often necessary and/or desirable that a relatively large number of signals be capable of being present on an acoustic delay line at any one time. This can be accomplished by lengthening the delay element which also lengthens the delay time. However, for many applications, the delay time is fixed by the requirements of the associated circuits, equipment, systems, etc. Since the length of the stress wave, and therefore the number of stress waves which may be present and distinguishable from one another at any one time on a given length of delay element, is determined by the length of the input coil, a higher packing density along the length of the delay line corresponding to a higher frequency signal applied to the input coil can be obtained by reducing the length of the input coil. The increased packing density obtained in this manner is limited by the difficulty of fabricating sufficiently small coils and by the fringe field effect of such coils which causes the length of the induced stress wave to be greater than the length of the input coil. An acoustic delay line adapted to have higher frequency signals applied thereto can be obtained by generating shorter stress waves which would necessarily have a length shorter than the input coil length and input coil fringe field effect.

Accordingly, one object of this invention is to provide an improved acoustic delay line apparatus.

Another object of this invention is to provide an acoustic delay line which overcomes these and other high-frequency limitations of prior art acoustic delay lines.

A further object of this invention is to provide an acoustic delay line which is adapted to have a high-frequency signal applied thereto by enabling acoustic stress waves in a delay element produced by a high-frequency input signal to have a length shorter than the length of an input coil.

A still further object of this invention is to provide an acoustic delay line which is adapted to have a high-frequency signal applied thereto by enabling acoustic stress waves in a delay element produced by a high-frequency input signal to have a length which is independent of the length of an input coil.

Briefly described, these and other objects of the present invention are accomplished by acoustic delay line apparatus which includes an elongated delay element capable of propagating acoustic waves therealong and having a relatively short length of magnetostrictive material located adjacent one end thereof. An input coil surrounds the length of magnetostrictive material and has a length greater than the length of said magnetostrictive material. The elongated delay element is adapted to have an acoustic wave induced therein by an electrical signal applied to said input coil, with the length of the acoustic wave being determined by the length of said magnetostrictive material and said magnetostrictive material having a length which enables a desired signal frequency to be propagated along said elongated delay element. Transducer means are located adjacent the other end of the elongated element for producing electrical output signals in response to acoustic waves induced in said delay line by the electrical signals applied to said input coil.

These and other features, objects and advantages of the present invention are described in detail hereinbelow in conjunction with the following drawings wherein.

Figures 1, 4:
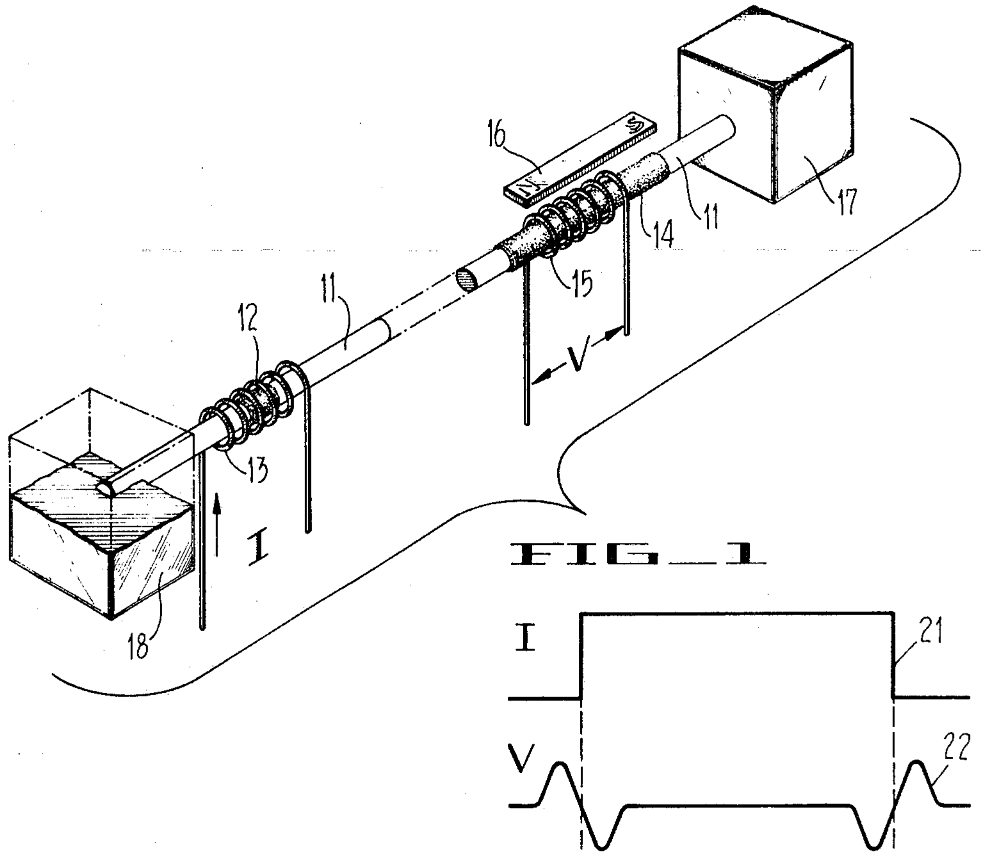
FIG. 1 is a view in perspective illustrating an acoustic delay line apparatus in accordance with the present invention.
FIG. 4 illustrates idealized input and output wave shapes obtained when the apparatus of FIG. 1 is operated in the NRZ mode.
Figure 2:
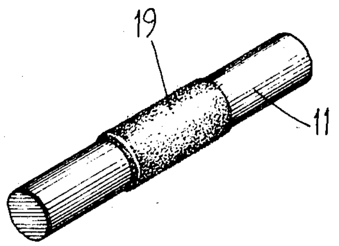
FIG. 2 is a view in perspective illustrating a portion of a delay element which may be utilized in the apparatus of FIG. 1.
Figure 3:
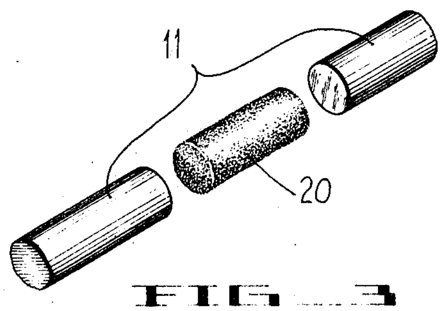
FIG. 3 is a view in perspective illustrating a portion of another delay element which may be utilized in the apparatus of FIG. 1.

Referring now to the drawings, FIG. 1 illustrates acoustic delay line apparatus in accordance with the present invention as comprising an elongated delay element 11 which may comprise a tape or wire of a suitable nonmagnetostrictive material, such as a beryllium-copper alloy. Even though nonmagnetrostrictive, the material of the delay element 11 is capable of propagating acoustic stress waves. For purposes of clarity, only the two ends of the delay element 11 are illustrated. The intermediate portion of the delay element 11 (not shown) can be straight, coiled or otherwise configured. Input transducer means for converting an electrical signal into an acoustic stress wave in the delay element 11 is associated with one end of the delay element and comprises a relatively short length of magnetostrictive material 12, such as nickel. The magnetostrictive material 12 may be applied to the delay element 11 as a layer of separate material 19, as illustrated in FIG. 2, by any suitable method, such as electroplating. When electroplated nickel was utilized, it was found advantageous to anneal the nickel layer in an atmosphere, such as argon or hydrogen, in order to increase the permeability of the nickel layer 19. Further, it was found that the layer 19 should have a sufficient thickness to effectively convert electromechanical energy to acoustic energy and yet be thin enough so that its eddy current losses were relatively small. For electrical signals having a frequency in excess of one megacycle, a layer of magnetostrictive material of about .0005 inch was found to be suitable for these purposes. Alternatively, the relatively short length of magnetostrictive material 12 of FIG. 1 may be sandwiched between segments of the delay line element 11 to constitute a portion of the length thereof, as illustrated by the reference character 20 of FIG. 3. This arrangement has the disadvantage of relatively high eddy current losses but has the advantage of good power transfer between an input coil and the delay element 11. Referring again to FIG. 1, an input coil 13 surrounds the length of magnetostrictive material 12 and has a length greater than the length of the magnetostrictive material. An output transducer is associaed with the other end of the delay element 11 for converting the acoustic stress waves induced in the delay element into a representative voltage variation and includes a length of magnetostrictive material 14 which is substantially similar to the length of magnetostrictive material 12 but having a length which is substantially greater than the length of magnetostrictive material 12. An output coil 15 surrounds a portion of the length of the magnetrostrictive material 14 and a permanent bar magnet 16 insures that a uniform magnetic field extends throughout the length of the output coil 15. As will be apparent from the detailed description which follows, the present invention is not limited to the output transducer illustrated in FIG. 1 inasmuch as other output transducers long used in the acoustic delay line art may be utilized in practicing the present invention. Pads 17 and 18 of a suitable acoustic energy absorbing material are located at each end of the delay element 11 to absorb acoustic energy in order to prevent reflections within the delay element in a well-known manner. The delay time of the apparatus is determined by the distance between the input 13 and output 15 coils and the delay element 11 material.

The operation of the apparatus illustrated in FIG. 1 is such that a change of current I in the input coil 13 produces a corresponding change in the magnetic field produced by this coil. The change in the magnetic field will change, very slightly, the physical dimensions of the magnetostrictive material 12 in accordance with the well-known magnetostrictive effect. Since the delay element 11 is fabricated from nonmagnetostrictive material, this dimensional change takes place only at the magnetostrictive material 12 even though the input coil 13 has a length greater than the material 12. However, since the delay material 11 is capable of propagating an acoustic stress wave, the change in dimensions of the magnetostrictive material 12 launches an acoustic stress wave along the delay element 11 in both directions from the magnetostrictive material 12. The stress wave traveling to the left is absorbed by the material 18, whereas the stress wave traveling to the right passes through the magnetostrictive material 15 and is then absorbed by the material 17. When traveling through the magnetostrictive material 15, the stress wave will vary the reluctance of the permanent magnet 16 circuit in a well-known manner to cause a flux change, which change in flux cuts the turns of the output coil 15 to induce a corresponding output voltage V therein. The stress wave induced in the delay element 11 has a width which is determined by the width of the magnetostrictive material 12 and is therefore independent of the length of the input coil 13. By causing the length of the magnetostrictive material 12 to be very short, stress waves having a very short length can be induced in the delay element 11 such that a very high-frequency signal, or packing density, may be applied to the input coil 13 and obtained from the output coil 15 after the required delay time. For example, signal frequencies, or repetition rates, well in excess of one megacycle have been obtained by using a length of magnetostrictive material 12 of about .03 inch and less. Stress waves induced in this manner are considerably shorter than can be obtained with a very small coil and the corresponding fringe effect associated with such coils. In other words, by making the length of the stress wave induced in the delay element 11 completely independent of the length of the input coil 13, very short stress waves can be induced in the delay element 11 such that a very high-frequency input signal may be applied to the input coil 13 and propagated along the delay element 11 with each signal being easily distinguishable from an adjacent signal.

By causing the output coil 15 to have a length which is considerably shorter than the length of magnetostrictive material 14, maximum flux coupling to the output coil 15 is obtained to produce an optimum output voltage V across the output coil 15. Accordingly, the length of the magnetostrictive material 14 is many times greater than the length of the magnetostrictive material 12.

The apparatus of FIG. 1 may be operated in either the RZ or NRZ modes. Referring now to FIG. 4, which illustrates input and output wave shapes for an NRZ mode of operation, it is shown that the input current wave form 21 is substantially a flat-topped pulse of current which produces a dipole output voltage wave shape 22 which comprises essentially a sine wave for each leading and trailing edge of the current pulse with the corresponding sine waves being the mirror image of one another.

Figure 5:
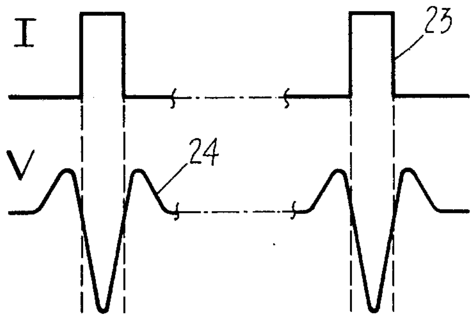
FIG. 5 illustrates idealized input and output wave shapes obtained when the apparatus of FIG. 1 is operated in the RZ mode.

FIG. 5 illustrates a current input 23 and output voltage 24 wave shape for an RZ mode of operation for which an entire input pulse corresponds to a single signal or data rather than increasing and decreasing current corresponding to a separate signal or data. The output wave shape 24 associated with this type of input consists of a triad pulse having two positive portions and a negative portion having a magnitude which is greater than the positive-going portions. This output wave shape 24 is obtained by having an input pulse 23 of sufficient length that, in effect, causes the two mirror image sine wave outputs 22 illustrated in FIG. 4 to overlap such that only their negative portions add algebraically in a well-known manner. The required width of the input pulse 23 to obtain the wave shape 24 is determined both by the width of the magnetostrictive material 12 which determines the width of the stress wave induced in the delay element 11 and by the type of output transducer utilized with the delay element 11 inasmuch as the output transducer also determines the width of the output voltage pulses obtained by the delay line. However, regardless of the mode of operation, the very short stress waves obtained with the present invention enable a higher frequency signal to be applied to the delay element 11 than was heretofore possible with prior art acoustic delay line apparatus.

What has been described is acoustic delay line apparatus which is adapted to have a very high signal frequency applied thereto inasmuch as the length of the acoustic stress waves induced therein are independent of the length of the input coil utilized therewith.

What is claimed is:

1. An acoustic delay line adapted to propagate a high-frequency signal comprising; an elongated delay element capable of propagating acoustic waves therealong, a first layer of magnetostrictive material surrounding a portion of the length of said elongated element adjacent one end thereof, a first coil surrounding said first layer of magnetostrictive material and having a length greater than the length of said first magnetostrictive material, said elongated delay element adapted to have an acoustic wave induced therein by an electrical signal applied to said first coil with the length of the acoustic signal being determined by the length of said first magnetostrictive material and said first magnetostrictive material having a length which enables a desired signal frequency to be propagated along said delay line, and transducer means located adjacent the other end of said elongated delay element for producing electrical signals in response to acoustic waves induced in said delay line by electrical signals applied to said first coil, said transducer means including a second length of magnetostrictive material adjacent the other end of said elongated element with said transducer means including a second coil surrounding said second magnetostrictive material and having a length less than the length of said second length of magnetostrictive material which has a length greater than said first length of magnetostrictive material.

2. The delay line according to claim 1 wherein said first layer of magnetostrictive material having a length less than said surrounding first coil comprises a layer of annealed nickel about .005 inch thick and about .03 inch wide to enable said delay line to propagate frequencies in excess of one megacycle per second.

References Cited

UNITED STATES PATENTS

| | | | |
|---|---|---|---|
| 2,718,637 | 9/1955 | Goodwin | 343—7.7 |
| 2,797,410 | 6/1957 | Korman et al. | 343—7.7 |
| 2,815,490 | 12/1957 | De Faymoreau. | |
| 2,837,721 | 6/1958 | Millership. | |

FOREIGN PATENTS

| | | |
|---|---|---|
| 1,362,895 | 4/1964 | France. |
| 823,549 | 11/1959 | Great Britain. |

HERMAN KARL SAALBACH, Primary Examiner

C. BARAFF, Assistant Examiner

U.S. Cl. X.R.

343—7.7